United States Patent
Mouquet et al.

(10) Patent No.: US 10,959,102 B2
(45) Date of Patent: *Mar. 23, 2021

(54) SELECTION OF A NETWORK SLICE INSTANTIATION FOR TRANSMITTING UPLINK PACKETS

(71) Applicant: Orange, Paris (FR)

(72) Inventors: Antoine Mouquet, Courbevoie (FR); Ali-Amine Mouafik, Guadeloupe (FR)

(73) Assignee: ORANGE, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/750,643

(22) Filed: Jan. 23, 2020

(65) Prior Publication Data

US 2020/0162927 A1 May 21, 2020

Related U.S. Application Data

(63) Continuation of application No. 16/082,992, filed as application No. PCT/FR2017/050484 on Mar. 3, 2017, now Pat. No. 10,588,022.

(30) Foreign Application Priority Data

Mar. 7, 2016 (FR) ...................................... 1651892

(51) Int. Cl.
*H04W 16/02* (2009.01)
*H04W 48/16* (2009.01)
(Continued)

(52) U.S. Cl.
CPC ............. *H04W 16/02* (2013.01); *H04L 45/64* (2013.01); *H04W 28/0215* (2013.01);
(Continued)

(58) Field of Classification Search
CPC . H04W 16/02; H04W 28/0215; H04W 48/16; H04W 48/18; H04W 60/04; H04L 45/64
See application file for complete search history.

(56) References Cited

U.S. PATENT DOCUMENTS

2012/0002620 A1   1/2012   Kokku et al.
2015/0139238 A1   5/2015   Pourzandi et al.
(Continued)

FOREIGN PATENT DOCUMENTS

FR   3008843 A1   1/2015

OTHER PUBLICATIONS

3GPP TR 22.864 v0.3.1 (Feb. 2016) 3rd Generation Partnership Project; Technical Specification Group Services and System Aspects; Feasibility Study on New Services and Markets Technology Enablers—Network Operation; Stage 1 (Release 14) (Year: 2016).*

(Continued)

*Primary Examiner* — Gary Mui
(74) *Attorney, Agent, or Firm* — David D. Brush; Westman, Champlin & Koehler, P.A.

(57) ABSTRACT

A method for transmitting in a communication network uplink data from an application module in a user terminal. The method includes: determining, by the user terminal, if a correspondence exists between an application module providing at least one uplink packet and at least one rule designating a network slice instantiation to be used for transmitting uplink packets in the communication network; and in response to a determination by the user terminal that the application module providing at least one uplink packet corresponds to a rule designating a network slice instantiation to be used for transmitting the uplink packet in the communication network, transmitting the at least one uplink packet from the user terminal to an entity for access to a user plane of the designated network slice instantiation.

14 Claims, 2 Drawing Sheets

(51) Int. Cl.
  *H04W 48/18* (2009.01)
  *H04W 60/04* (2009.01)
  *H04W 88/06* (2009.01)
  *H04L 12/715* (2013.01)
  *H04W 28/02* (2009.01)
  *H04W 48/14* (2009.01)

(52) U.S. Cl.
  CPC ........... *H04W 48/16* (2013.01); *H04W 48/18* (2013.01); *H04W 60/04* (2013.01); *H04W 88/06* (2013.01); *H04W 48/14* (2013.01)

(56) References Cited

U.S. PATENT DOCUMENTS

| | | |
|---|---|---|
| 2016/0157170 A1 | 6/2016 | Daoud Triki et al. |
| 2016/0164835 A1 | 6/2016 | Hoffmann et al. |
| 2016/0337902 A1 | 11/2016 | Hahn et al. |
| 2016/0352645 A1 | 12/2016 | Senarath et al. |
| 2016/0359736 A1 | 12/2016 | Qi et al. |
| 2017/0005869 A1 | 1/2017 | Prasad et al. |
| 2017/0026274 A1 | 1/2017 | Wang et al. |
| 2017/0079059 A1 | 3/2017 | Li et al. |
| 2017/0142010 A1 | 5/2017 | Mathew et al. |
| 2017/0245316 A1 | 8/2017 | Salkintzis |
| 2018/0048465 A1 | 2/2018 | Schliwa-Bertling et al. |
| 2018/0206152 A1 | 7/2018 | Zhang et al. |
| 2018/0359688 A1 | 12/2018 | An et al. |
| 2018/0368060 A1 | 12/2018 | Kedalagudde et al. |
| 2019/0021047 A1 | 1/2019 | Zong |
| 2019/0037409 A1 | 1/2019 | Wang et al. |

OTHER PUBLICATIONS

Ericsson; Network slice selection; SA WG2 Meeting #113AH Feb. 23-26, 2016, Sophia Antipolis, France; S2-160989 (Year: 2016).*

Huawei, Hisilicon; Key Issue on Policy Framework; SA WG2 Meeting #113AH Feb. 23-26, 2016, Sophia Antipolis, France; S2-161016 (Year: 2016).*

Ericsson; Network slice selection;SA WG2 Meeting #113AH Feb. 23-26, 2016, Sophia Antipolis, France; S2-161130 (Year: 2016).*

Orange; New solution for Key Issue 1: Network slice selection based on rules provided by the network; SA WG2 Meeting #114 Apr. 11-15, 2016, Sophia Antipolis, FR; S2-161453 (Year: 2016).*

Motorola Mobility, Lenovo; Solution: PDU Sessions served by different Network Slices; SA WG2 Meeting #114 Apr. 11-15, 2016, Sophia Antipolis, France; S2-161574 (Year: 2016).*

International Search Report dated May 2, 2017 for corresponding International Application No. PCT/FR2017/050484, filed Mar. 3, 2017.

Written Opinion of the International Searching Authority dated May 2, 2017 for corresponding International Application No. PCT/FR2017/050484, filed Mar. 3, 2017.

English translation of the International Written Opinion of the International Searching Authority dated May 16, 2017 for corresponding International Application No. PCT/FR2017/050484, filed Mar. 3, 2017.

"3rd Generation Partnership Project; Technical Specification Group Services and System Aspects; Study on Architecture for Next Generation System (Release 14)." 3GPP Standard; 3GPP TR 23.799, vol. SA WG2, No. V0.2.0. Feb. 10, 2016.

"3rd Generation Partnership Project; Technical Specification Group Services and System Aspects; Feasibility Study on New Services and Markets Technology Enablers; Stage 1 (Release 14)." 3GPP Draft; TR22.891, V1.3.0. Feb. 8, 2016.

Venmani et al. "OpenFlow as an Architecture for e-Node B Virtualization." Lecture Notes of the Institute for Computer Sciences, Social Informatics, and Telecommunications Engineering, vol. 92. Published Jan. 1, 2012.

Office Action dated Oct. 10, 2019 from the USPTO for corresponding U.S. Appl. No. 16/082,992, filed Sep. 7, 2018.

Notice of Allowance dated Jan. 2, 2020 from the USPTO for corresponding U.S. Appl. No. 16/082,992, filed Sep. 7, 2018.

* cited by examiner

SELECTION OF A NETWORK SLICE INSTANTIATION FOR TRANSMITTING UPLINK PACKETS

CROSS-REFERENCE TO RELATED APPLICATIONS

This application is a continuation of U.S. application Ser. No. 16/082,992, Filed Sep. 7, 2018, which is a Section 371 National Stage Application of International Application No. PCT/FR2017/050484, filed Mar. 3, 2017, and published as WO 2017/153667 on Sep. 14, 2017, not in English, the contents of which are incorporated herein by reference in their entireties.

FIELD OF THE DISCLOSURE

The present invention relates to the field of telecommunications networks, and more particularly that of mobile telecommunication networks.

BACKGROUND OF THE DISCLOSURE

The architecture of these mobile telecommunications networks has hitherto been standardized via a standardization group known by the name 3GPP. Such is in particular the case for the so-called "2G", "3G" and "4G" mobile networks, whose various architectures are defined in technical specifications established by such a body.

Up to the "4G" generation of mobile network currently being rolled out, the various network architectures relied on very specific equipment dedicated to certain precise functionalities, be it at the level of the access network or of the network core, in particular as regards the transmission of packets from or to a mobile terminal.

The lack of flexibility and of upgradability inherent in this type of conventional architecture has led to envisaging the adoption of more flexible architectures for the next mobile network generation, called "5G", so as to be able to respond rapidly to extremely diverse demands in terms of traffic or quality of service.

Among the envisaged solutions, one of the most promising solutions relies on a technique known as "network slicing" in English, which is mentioned in particular in the technical report 3GPP TR 23.799 v0.2.0 of February 2016.

Such a network slicing technique allows the operator of a telecommunications network to create "bespoke" networks, capable of providing optimized solutions for very varied scenarios with very diverse constraints in terms of functionality and performance.

The concept of network slicing relies on three distinct layers, namely the "resource" layer, the "network slice instantiation" layer and the "service instantiation" layer.

The first "resource" layer comprises all the physical and logical resources of a network, in terms of calculation power, memory and transmission capability, that are necessary for the execution of the instantiation of one or more network slices.

In this respect, the so-called "physical" resources are all the equipment having calculation capabilities, storage means and transmission capabilities within a network. The so-called "logical" resources can then consist in a part of a physical resource, or on the contrary in a bundling of several physical resources that are dedicated to a network function or are shared between several network functions.

The second "network slice instantiation" layer is composed of the various instantiations of slices of the network serving to offer services, each instantiation being able to be decomposed into one or more network functions executed by physical and/or logical resources of the "resource" layer.

Finally, the third "service instantiation" layer represents services (to the user or to a company) that can be supported by the second layer, that is to say by calling upon one or more network slice instantiations to provide the network characteristics necessary for a requested service instantiation.

Thus, a network layer instantiation can be defined as being a set of network functions and of resources making it possible to execute these network functions, being akin to a complete logical network making it possible to obtain certain characteristics requested by a service instantiation.

Provision is thus made for a multitude of network slice instantiations to be able to be executed simultaneously within one and the same physical telecommunications network, so as to offer various services across this network.

However, at this juncture, user access, via the user's terminal, to one or the other of these instantiations has not been envisaged. In particular, a conventional mobile terminal in a "4G/LTE" network is always connected to a single very specific MME entity ("Mobility Management Entity") and a single very specific gateway S-GW which in this instance are situated in the core of the mobile telecommunications network, in order to be able to obtain various services and to access external networks.

A conventional mobile terminal does not therefore have the ability to be able to connect to various instantiations of network slices such as may be envisaged in future networks, which rely potentially on diverse and varied physical and logical resources.

SUMMARY

An exemplary embodiment proposes a method for selecting a network slice instantiation in a communication network for the transmission of uplink data from a user terminal, the method comprising the following steps, subsequent to the receipt of an uplink packet by a communication module of the user terminal:

verify the correspondence between the uplink packet and at least one rule designating a network slice instantiation able to transmit the uplink packet in the communication network; and when the uplink packet corresponds to a rule designating a network slice instantiation, transmit the uplink packet to an entity for access to the user plane of the designated network slice instantiation.

The operator of a communication network can thus segment its network as a function of various usages and levels of service, for example by proposing a very robust network slice for services that need high availability (critical mission) and a not very robust network slice for services that are able to accept service interruptions. A user terminal can then select a specific instantiation from among various network slices available as a function of the service that he wishes to obtain through the dispatching of uplink packets, and thus benefit from network conditions specifically tailored to the need of this service, in a flexible and simple manner.

According to an advantageous embodiment, when no rule designating a network slice instantiation corresponds to the uplink packet, the uplink packet is transmitted to an entity for access to the user plane of a default network slice instantiation.

The use of a default network slice instantiation allows the operator of the network to propose a default access to the network for the terminal, even though the service invoked thereby does not correspond to any specific network slice instantiation at a given instant. This default instantiation can then be used by the operator to provide a certain amount of information to the user terminal, particularly rules for selecting network slice instantiations tailored to the services that may be requested by this terminal.

According to a particular aspect of this advantageous embodiment, the method furthermore comprises a prior phase of attachment of the user terminal to the default network slice instantiation, in the course of which the communication module receives, from an entity for access to the control plane of the default network slice instantiation, an attachment acknowledgment message containing said at least one rule designating a network slice instantiation. This allows the operator of the network to ensure the control, through the establishment of a default access to the network provided to the terminal, of the selection from among various network slice instantiations that the terminal may make for various types of services.

According to another particular aspect of this advantageous embodiment, the communication module receives, from the entity for access to the control plane of the default network slice instantiation, a message containing said at least one rule designating a network slice instantiation, thereby allowing the operator of the network to be able to perform real-time control of the instantiation selection that the terminal may make for various types of services. This message can thus be either a message of initial provision or a message of updating of the rule in question.

According to another particular aspect of this advantageous embodiment where the at least one rule furthermore comprises a parameter of duration of validity, the method furthermore comprises:

the verification of the parameter of duration of validity of said at least one rule; and when the duration of validity of said at least one rule has expired, the transmission, to the entity for access to the control plane of the default network slice instantiation, of a request for obtaining said message for updating said at least one rule.

This allows optimization of the updating of the instantiation selection rules, by invoking their updating only after the expiry of the whole set of these rules.

According to another advantageous embodiment, when the uplink packet corresponds to a rule designating a network slice instantiation to which the user terminal is not attached, the communication module transmits an attachment request to an entity for access to the control plane of the designated network slice instantiation, the uplink packet being transmitted subsequent to the receipt of an attachment acknowledgment message originating from the entity for access to the control plane.

According to another advantageous embodiment, the at least one rule contains at least one parameter determined from among a destination address of the packets, a transport protocol, a source port, a destination port, an application protocol, an item of information of location of the terminal or a time slot of application of the rule, the verification of the correspondence between the uplink packet and said at least one rule comprising the verification of the fit between a parameter of the uplink packet and the determined parameter. The selection of the instantiation can thus be carried out simply, by filtering the uplink packets with respect to certain of their parameters so as to steer them toward an instantiation tailored to the corresponding service.

According to another advantageous embodiment, the method furthermore comprises a prior step of verification of whether the uplink packet belongs to a new data stream, the verification of the correspondence between the uplink packet and at least one rule being performed when the uplink packet does belong to a new data stream; and when the uplink packet does not belong to a new data stream, the uplink packet is transmitted to an entity for access to the user plane of the network slice instantiation used for at least one previous uplink packet of the data stream to which the uplink packet belongs.

According to another advantageous embodiment, when the terminal is attached to a network slice instantiation and if it does not exchange any payload data packet with an entity for access to the user plane of said network slice instantiation during a determined time span, the communication module transmits a detachment request to an entity for access to the control plane of said network slice instantiation. This makes it possible to release the reserved resources when the terminal is attached to an unused instantiation, particularly context information stored in memory in the user terminal and the equipment of the network.

According to a particular aspect of this advantageous embodiment in which the detachment request relates to a default network slice instantiation and is transmitted to an entity for access to the control plane of said default network slice instantiation, the method furthermore comprises:

the verification of a parameter of duration of validity contained in said at least one rule; and when the duration of validity of said at least one rule has expired, the transmission, to the entity for access to the control plane of the default network slice instantiation, of a request for attachment to the default network slice instantiation and, subsequent to the receipt of an attachment acknowledgment message, of a request for updating said at least one rule.

This allows an updating of the rules for selecting the instantiations as a function of a service requested by the user while safeguarding the resources both terminal side and network side while avoiding remaining needlessly attached to a default instantiation.

The present invention also envisages a user terminal comprising a communication module configured to:

verify the correspondence between an uplink packet received from an application module of the user terminal and at least one rule designating a network slice instantiation in a communication network in which the uplink packet is to be transmitted; and when the uplink packet corresponds to a rule designating a network slice instantiation, transmit the uplink packet to an entity for access to the user plane of the designated network slice instantiation.

The present invention also envisages a network entity, able to allow access to the control plane of a network slice instantiation in a communication network, comprising a communication module configured to transmit to a user terminal a message containing at least one rule designating a network slice instantiation in the communication network to be used by this user terminal to transmit an uplink packet. Such a network entity can in particular be an entity for access to the control plane of an access network or of a network core, when a network slice instantiation in the communication network is separated according to this distinction.

The present invention also envisages a communication network comprising at least one network entity such as described hereinabove, configured to provide access to a user terminal at the control plane of a network slice instantiation implemented in the communication network, as well as a network entity configured to provide this terminal with access to the user plane of the instantiation so as to allow the dispatching of an uplink packet in said user plane of the instantiation.

The present invention also envisages a computer program comprising code instructions for the implementation of the method of selection hereinabove when the program is executed by the processor of a user terminal.

This program can use any programming language, and be in the form of a source code, object code, or of code intermediate between source code and object code, such as in a partially compiled form, or in any other desirable form.

The invention also envisages a recording medium on which are stored the code instructions of a computer program such as mentioned hereinabove.

This information medium can be any entity or device capable of storing the program. For example, the medium can comprise a storage means, such as a ROM, for example a CD-ROM or a microelectronic circuit ROM, or else a magnetic recording means, for example a diskette or a hard disk. Moreover, this information medium can be a transmissible medium such as an electrical or optical signal, which can be conveyed via an electrical or optical cable, by radio or by other means. The program according to the invention can in particular be downloaded from a network of Internet type.

BRIEF DESCRIPTION OF THE DRAWINGS

Other characteristics and advantages of the invention will become apparent on reading in the description detailed hereinafter of particular embodiments, given by way of nonlimiting examples, and of the appended figures in which.

DETAILED DESCRIPTION OF ILLUSTRATIVE EMBODIMENTS

Figure 1:
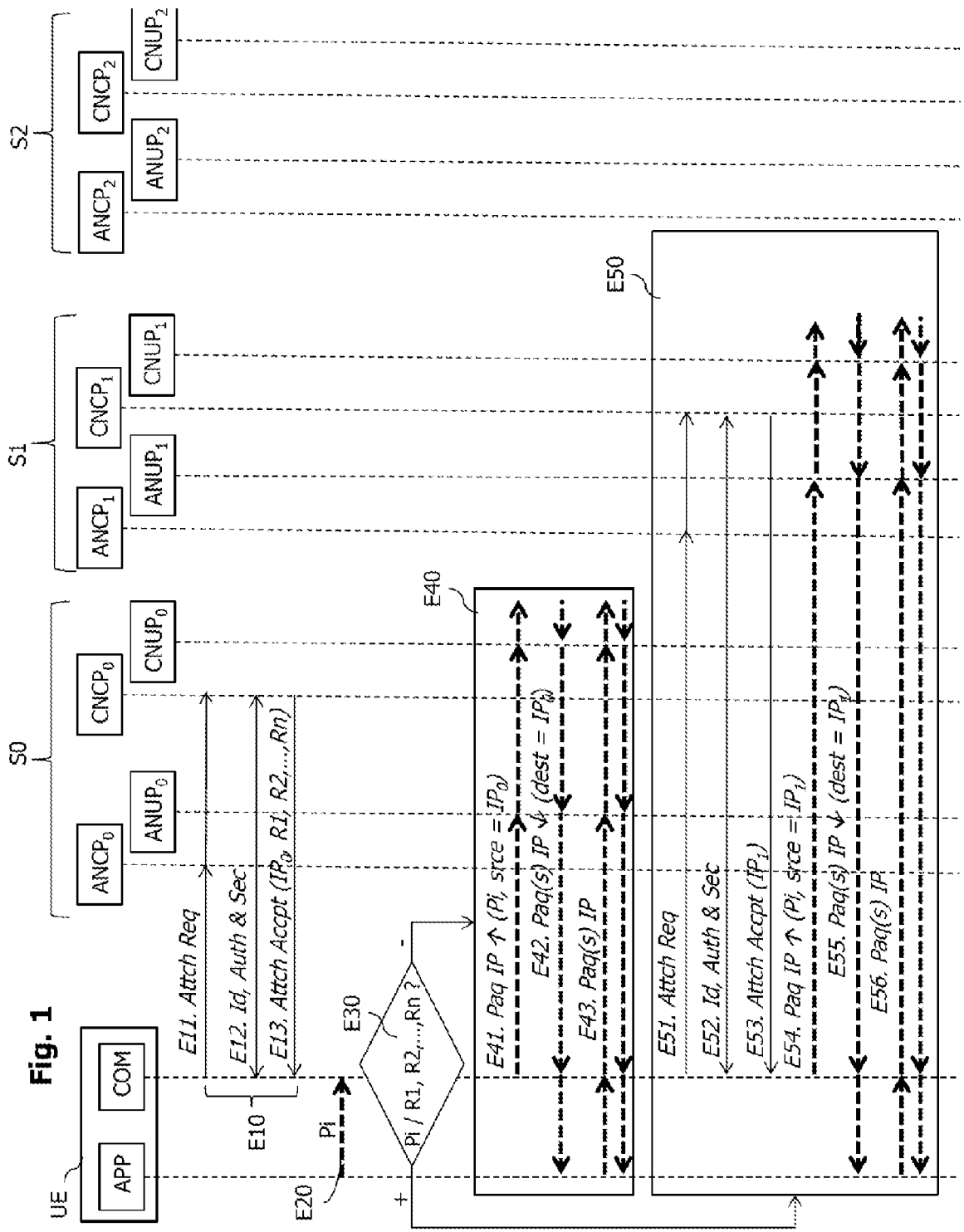
FIG. 1 illustrates the steps of the method of selection according to one embodiment of the invention.

Reference is first made to FIG. 1 which illustrates the steps of the method of selection according to one embodiment of the invention.

In this figure is represented, on the one hand, a user terminal UE, which can be a mobile terminal, a smartphone, a computer with a radio interface or any other type of equipment capable of communicating with a wired or radio access network.

This terminal UE comprises, on the one hand, an application module APP (or indeed several, a single module being illustrated in FIG. 1) capable of executing software applications on the terminal UE and, on the other hand, a communication module COM capable of receiving data, in the form of packets, from the application module APP so as to transmit them to a mobile telecommunications network and conversely to receive data packets from a mobile network so as to transmit them to the module APP.

The module APP can consist of a purely software module (such as a mobile software application) or of a module composed of a processor associated with a memory in which are stored code instructions that may correspond to a mobile software application.

The module COM comprises in particular an transmitter/receiver (radio for a mobile terminal UE), able to receive downlink data packets originating from the network and to transmit uplink data packets from the module APP to the network, as well as a processor associated with a memory able to store code instructions executable by the processor to process the data received from the network or from the module APP, for example to encapsulate the data packets according to a transmission protocol before their transmission by the transmitter/receiver or to select a network slice instantiation of a communication network for the transmission of these packets, as will be seen further on.

Moreover, a mobile telecommunications network is represented here according to the principle of network slicing, here with three network slice instantiations S0,S1,S2 purely by way of nonlimiting illustration.

Each network slice instantiation comprises a certain number of entities at the level of the control plane (for signaling) and of the user plane (for transmitting payload data), in particular a first so-called entity for access to the user plane of the instantiation, allowing the exchange of payload data between the instantiation and the communication module COM of the terminal UE, and a second so-called entity for access to the control plane of the instantiation, allowing the exchange of signaling messages between the instantiation and the communication module COM of the terminal UE.

These two entities can take the form of a base station (such as an eNodeB), that may optionally be decomposed into a user plane part and a control plane part according to the type of network slice instantiation used. These entities thus have a communication module (typically exhibiting a radio transmitter/receiver associated with a processor and memory means capable of storing software instructions executable by this processor so as to process the data to be transmitted by the transmitter/receiver) which is able to receive requests or messages from the terminal UE and is configured to prepare and dispatch messages to the communication module COM of the terminal UE.

In the particular case of the network illustrated in FIG. 1, each instantiation distinguishes access network functions and network core functions, in order to reflect an architecture similar to the existing architecture of the networks of previous generations, so that the instantiation comprises, for the slice S0 (similar holds for the slices S1 and S2):

- an entity for access to the control plane of the access network, termed $ANCP_0$ (for "Access Network Control Plane"), and intended to be linked up directly with the terminal UE for the exchange of signaling messages.
- an entity for access to the user plane of the access network, termed $ANUP_0$ (for "Access Network User Plane"), and intended to be linked up directly with the terminal UE for the exchange of the payload data.
- an entity for access to the control plane of the network core, termed $CNCP_0$ (for "Core Network Control Plane"), able in particular to be in charge of managing the mobility and reachability of the terminals, quality of service, security, establishment of data sessions, metering, interaction with external entities so as to control the provision of services, etc.
- an entity for access to the user plane of the network core, termed $CNUP_0$ (for "Core Network User Plane"), and intended to transport the payload data from and to a network external to the communication network under the control of the entity $CNCP_0$.

The method may optionally start with a prior step E10 of attachment of the terminal UE to a network slice instantiation S0, termed the default instantiation. In the course of this step E10:

- the communication module COM of the terminal UE transmits (step E11) an attachment request to the entity $ANCP_0$, which forwards this request to the entity $CNCP_0$.
- Subsequent to the receipt of this request, the entity $CNCP_0$ triggers exchanges (step E12) of messages with the module COM of the terminal UE so as to identify the terminal UE, to authenticate its user and to set up security parameters (encryption, integrity control, etc.) in a manner known per se.
- Once the identification, the authentication and the setting up of the security parameters are validated, the entity $CNCP_0$ can then return (step E13) a message of acknowledgment of the attachment to the module COM of the terminal UE, so as to confirm to the terminal UE its attachment to the instantiation S0.

Such an acknowledgment message may contain an address or an identifier making it possible to address the terminal UE through the instantiation S0 from a network external to the operator's communication network, and in particular the Internet network. It may entail in particular an IP address or an IP prefix (here denoted $IP_0$) when the instantiation S0 is based on the IP transmission protocol. Hereinafter the case of IP addresses will be considered, although the invention is not limited to the IP protocol alone.

Insofar as the attachment to the instantiation S0 constitutes the first attachment to an instantiation of the telecommunications network, this acknowledgment message can advantageously furthermore contain a set of filtering rules R1, R2, . . . , Rn indicating to the module COM which instantiation to use for which type of uplink traffic.

These rules Ri are typically constructed by the entity $CNCP_0$, as a function of the constraints of the network operator, before being able to be transmitted to the terminal UE, by way of the entity $ANCP_0$ in the signaling plane of the instantiation S0. Alternatively, these rules Ri can be constructed by the entity $ANCP_0$ (that is to say at the level of the network access component of the instantiation S0), if this entity $ANCP_0$ is entitled to influence the steering of the uplink packets toward this or that network slice instantiation and has the information to do so.

These rules Ri may for example be encoded in the form of an XML file. They are intended to be evaluated with respect to the packets Pi that the module APP dispatches to the module COM for transmission to the network, and comprise one or more criterion(criteria) such as the destination IP address (or a slot of destination IP addresses) of the packets, the transport protocol, the source port, the destination port or the application protocol, inter alia.

These rules Ri may optionally pertain to parameters related to the environment of the terminal UE, such as a geographical or topological area (for example expressed in the form of a list of PLMN IDs or of TAIs), the time of day, etc.

These rules Ri furthermore advantageously comprise a parameter of duration of validity (or a date or time of expiry) and each one designates an instantiation S0, S1, S2 to be used for a packet corresponding to the rule.

These rules Ri may be generated as a function of the user's profile (for example general-public user, company, civil security, etc.) and may thus differ from one user to another. Accordingly, the entity $CNCP_0$ can comprise, or interact with, a user database containing the profile of each user who has subscribed to the communication network (similarly to a conventional HSS database), this profile comprising an item of information corresponding to the type of user. The entity $CNCP_0$ is then configured to provide series of specific rules for each type of user. Alternatively, the rules R1, R2 . . . can form an integral part of a user's profile.

Moreover, these rules Ri may be prioritized with respect to one another so as to allow the selection of a single instantiation when several instantiations correspond to one and the same uplink packet.

By way of example, an XML file describing rules Ri may thus take the following form:

```
<?xml version="1.0" encoding="UTF-8"?>
<Slicing>
    <Rule Name="R1">
        <RulePriority>1</RulePriority>
        <ipFlow>
            <flowDescription>
                <protocol>TCP</protocol>
                <DestinationIpAddress>
                    <ipV4Address>172.20.32.12</ipV4Address>
                    <ipV4Mask>32</ipV4Mask>
                </DestinationIpAddress>
                <DestinationPortNumber>
                    <port>1000</port>
                </DestinationPortNumber>
            </flowDescription>
        </ipFlow>
        <Slice>
            <SliceID>1</SliceID>
        </Slice>
    </Rule>
    <Rule Name="R2">
        <RulePriority>2</RulePriority>
        <ipFlow>
            <flowDescription>
                <protocol>TCP</protocol>
                <DestinationIpAddress>
                    <ipV4Address>172.22.0.0</ipV4Address>
                    <ipV4Mask>16</ipV4Mask>
                </DestinationIpAddress>
            </flowDescription>
        </ipFlow>
        <ValidityArea>
            <TAI>52291</TAI>
            <TAI>29956</TAI>
        </ValidityArea>
        <TimeOfDay>
            <TimeStart>08:00</TimeStart>
            <TimeStop>20:00</TimeStop>
        </TimeOfDay>
        <Slice>
            <SliceID>2</SliceID>
        </Slice>
    </Rule>
</Slicing>
```

In this XML file, two rules R1 and R2 are defined, rule R1 having priority over rule R2, these two rules designating two distinct instantiations to be used (identified by "SlideID") as a function of a transmission protocol (TCP), of a slot of destination addresses, of a destination port number for rule R1, of a validity area and of a time slot of validity for rule R2.

On completion of this step E10, the terminal UE is attached to the network slice instantiation S0 and can transmit and receive data for services offered via this instantiation S0. It has furthermore advantageously received a set of rules R1, R2, . . . , Rn that it has stored.

The communication module COM receives thereafter (step E20) data originating from the module APP, typically in the form of a first packet Pi, to be dispatched to the mobile network.

The communication module COM then undertakes the verification (step E30) of the correspondence between the packet Pi and one of the rules R1, R2, . . . , Rn stored by the terminal UE, stated otherwise if one of the filtering criteria defined in one of these rules is fulfilled by the packet Pi. In the eventuality that several rules were to correspond to the packet Pi, it is possible to take only the first of these rules into account if indeed the list of rules R1, R2, . . . , Rn is ordered, or to choose a rule expressly designated as having priority with respect to the others.

If it turns out that this verification is negative, and therefore that no rule Ri corresponds to the packet Pi to be transmitted, the default instantiation S0 can be used (step E40) for the exchanges of packets between the terminal UE and the telecommunications network within the framework of the service initiated by the first packet Pi.

In particular, this first packet Pi is dispatched (step E41) by the module COM, in the form of an uplink IP packet with the address $IP_0$ as source address, to the entity $ANUP_0$ of the instantiation S0, which forwards this packet to the entity $CNUP_0$ so that the latter forwards it to an external network for which the packet Pi is intended.

In response to this first uplink IP packet, one or more downlink IP packet(s) (i.e. originating from the external network via the entity $CNUP_0$) may thereafter be received (step 42) via the entity $ANUP_0$, these packets being transmitted to the terminal UE by means of the address $IP_0$ which has been allocated to it, used as destination address of these packets, allowing a conventional routing of such packets from the external network to the entity $CNUP_0$, and then the handling of these packets by the instantiation S0.

Similar exchanges of uplink and downlink packets can then place thereafter (step 43) so as to provide the desired service to the terminal UE through the network slice instantiation S0.

If it turns out that this verification is positive, and therefore that a correspondence has been found between the packet Pi and one of the stored rules Ri, the module COM uses (step E50) the instantiation Si designated by the rule Ri corresponding to the packet in order to transmit this packet.

Considered here is the case where a correspondence has been found with a rule R1 designating the instantiation S1, which is not the instantiation S0 to which this terminal is attached by default.

The terminal UE attaches firstly to this instantiation S1, by way of its module COM which dispatches (step E51) a request for attachment to the entity $ANCP_1$ of this instantiation S1, by means of radio access parameters (for example provided in the rule R1, this may also be parameters provided by the terminal UE itself when the access network is common to several network slice instantiations at the level of the network core). The receipt of this attachment request triggers a phase of identification, authentication and setting up of security parameters (step E52) by means of exchanges of messages between the module COM and the entity $CNCP_1$ of this instantiation S1 and, in case of validation of the procedures, the dispatching of a message of acknowledgment of attachment of the entity $CNCP_1$ to the module COM (step E53), similarly to steps E11, E12 and E13 described above.

At this juncture, the terminal UE is attached to the network slice instantiation S1, which has allocated it an address specific to the use of this instantiation S1 (here the address IP1).

The module COM of the terminal UE can then use this instantiation S1 to exchange packets with the network, by transmitting (step E54) the first packet Pi in the form of an uplink IP packet with the address $IP_1$ as source address, to the entity $ANUP_1$ of the instantiation S1, while receiving (step E55) in return one or more downlink IP packet(s) (i.e. originating from the external network via the entity $CNUP_1$) using the address $IP_1$ as destination address, such exchanges of uplink and downlink packets being able to continue thus (step E56), similarly to steps E41, E42 and E43 described above, in order to provide the desired service to the terminal UE via the instantiation S1.

It is thus seen that the module COM may remain attached simultaneously to several instantiations S0, S1, . . . , and this may be the case when it has several data streams to be exchanged with the network for several applications executed by the modules(s) APP which correspond to several rules Ri.

The module COM can advantageously trigger the detachment of the terminal UE from one of the instantiations to which it is attached, typically when it does not exchange any payload data packet with the user plane of this instantiation (that is to say that it does not receive from the module APP any uplink packet to be dispatched to this instantiation and that it does not receive any downlink packet intended for the module APP from this instantiation) during a determined time span (for example of the order of 10 min). In this case, the module COM dispatches a detachment request to the entity $ANCP_i$ of the instantiation Si concerned, which forwards this request to the entity $CNCP_i$ so that the latter undertakes, in a manner known per se, the detachment of the terminal UE, and returns a detachment acknowledgment message to the module COM on completion of this procedure. The terminal UE thus remains attached only to the instantiations Si of the network that it actually uses.

According to one embodiment, once attached to the default instantiation S0, the terminal UE remains attached to this instantiation S0, even were it to be used hardly or not at all for the transmission of payload data packets, so as to allow the dispatch at any moment of signaling messages of the entity $CNCP_0$ to the module COM, and in particular of a message of updating of the correspondence rules Ri, containing new rules Ri to be stored in the terminal UE or instructions for modifying the rules Ri already stored previously, or indeed for deleting certain rules Ri that have become obsolete.

According to another embodiment, even if the terminal UE were to be attached to a default instantiation S0, it can nevertheless detach itself from this instantiation S0 (for example by means of the detachment procedure described above, triggered by the module COM in the absence of receipt of any payload data packet originating from or destined for this instantiation S0 during a determined time span). In the latter case, on completion of an expiry time of the set of rules Ri, the module COM may advantageously again request attachment to the instantiation S0, according to the procedure of step E10, so as to obtain updated rules Ri.

Figure 2:
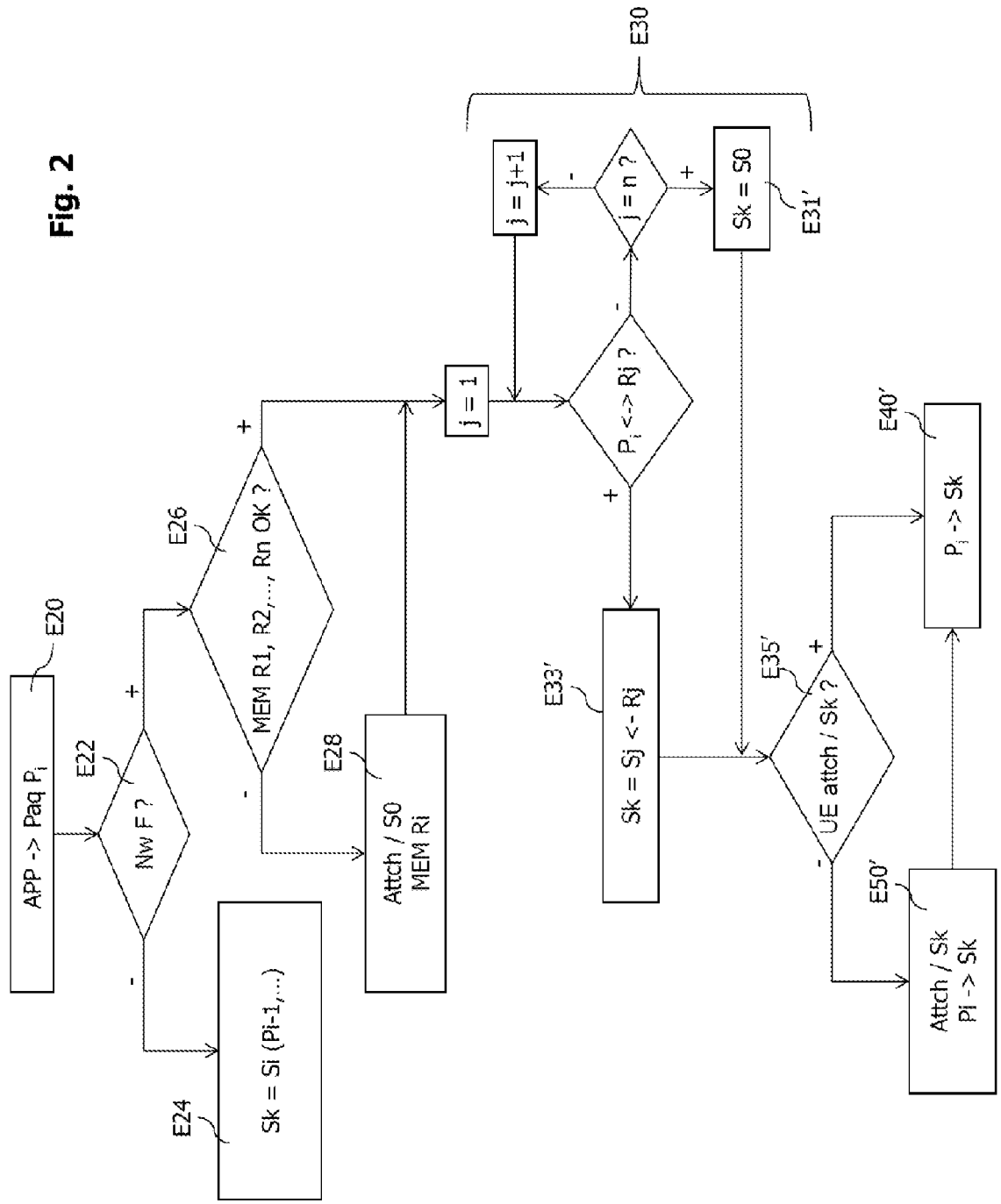
FIG. 2 represents a flowchart illustrating the steps of the method of selection according to the invention such as executed by the communication module of a user terminal.

Reference is now made to FIG. 2 which represents a flowchart illustrating the steps of the method of selection according to the invention such as are executed by the communication module of a user terminal.

Initially, the module COM receives a data packet Pi from the module APP (step E20 already discussed previously).

Subsequent to the receipt of this packet, the module COM can undertake the verification to check whether this packet Pi belongs to a new stream (step E22). This verification can be carried out by the consultation by the module COM of a stored table of active streams, storing for each active stream parameters such as the source and destination addresses and port numbers used, as well as protocol used, so as to compare these stored parameters with the corresponding parameters of the packet Pi.

If this verification is not conclusive, and if therefore the packet Pi is not the first packet of a new data stream, the instantiation Sk to be used to transmit this packet Pi is defined as being the instantiation Si, already used to transmit the previous packets Pi-1 of the same stream, which instantiation is then used again (step E24) to transmit this packet Pi (i.e. by dispatching this packet Pi to the entity $ANUP_i$ of this instantiation Si).

If this verification is conclusive, and if therefore the packet Pi is indeed a first packet of a new data stream, the module COM can then advantageously verify (step E26) whether the terminal UE has stored valid correspondence rules Ri, that is to say which have not yet expired. In the case where the expiry of a rule Ri automatically brings about its erasure from the memory where it is stored, this verification consists simply in verifying the presence, or otherwise, of a rule Ri in memory of the terminal UE.

If the terminal UE does not have any valid correspondence rule Ri in memory, for example because it has not been attached beforehand to a default instantiation S0, the module COM can trigger the attachment of the terminal UE to the default instantiation S0 (for example by means of a conventional network search scheme), similarly to step E10 described above, so as to obtain from the entity $CNCP_0$ up-to-date correspondence rules Ri (step E28).

If the terminal UE has valid correspondence rules Ri in memory, or else after having obtained them as indicated previously, the module COM can then undertake the verification (step E30) of a correspondence between the packet Pi and one of these correspondence rules. Accordingly, an iterative scheme can be employed to verify the correspondence between the packet Pi and the succession of stored rules R1, R2, . . . , Rn until it finds a possible correspondence.

If no correspondence is found by the module COM, the instantiation Sk to be used to dispatch the packet Pi is defined as being the default instantiation S0 (step E31'). If a correspondence is found with a rule Rj by the module COM, the instantiation Sk to be used to dispatch the packet Pi is defined as being the instantiation Sj designated by this rule Rj (step E33').

At this juncture, the module COM can verify (step E35') whether the terminal UE is already attached to the instantiation Sk designated for the dispatching of the packet Pi, in particular whether this instantiation has been designated by a rule Rk corresponding to the packet Pi (this may be the case also if the attachment of the terminal UE to a default instantiation S0 has not been undertaken beforehand).

If such is the case, and if therefore the terminal UE has already obtained an address IPk for this instantiation Sk, the packet Pi can be dispatched directly (step E40') to the entity $ANUP_k$ of this instantiation Sk, similarly to step E41 described above.

If such is not the case, the module COM triggers the attachment of the terminal UE to this instantiation Sk before dispatching the packet Pi via this instantiation Sk (step E50'), similarly to step E50 described above.

Of course, the invention is not limited to the exemplary embodiments hereinabove described and represented, on the basis of which it will be possible to provide for other modes and other embodiments, without however departing from the scope of the invention.

Thus, the IP protocol has been used in the embodiments described above, but any other network routing protocol can be employed.

Moreover, although FIG. 1 illustrates an exemplary application of network slicing applied to a network consisting of an access network (radio or wired) and of a network core, the invention is applicable to the case where network slicing would be applied to the network core alone, one single access network being used and common for all the instantiations of core network slices. In the latter case, the entities $ANCP_0$, $ANCP_1$, . . . form just a single entity ANCP of this common access network, the entities $ANUP_0$, $ANUP_1$, . . . form just a single entity ANUP of this common access network. The module COM then indicates the instantiation selected by means of the correspondence rules R1, R2 . . . in the signaling messages that it dispatches to the entity ANCP as well as in the payload data packets that it dispatches to the entity ANUP, thereby allowing the common access network to steer these signaling messages toward the right core network slice instantiation.

Moreover, although network slice instantiations with user plane and control plane separated at the access network level have been described above, the invention also applies to network slice instantiations in which these two planes are merged at the access network level, in which case the entities $ANCP_0$ and $ANUP_0$ may form just a single same entity, that can typically be implemented in the form of a base station or of an eNodeB.

As regards the network slice instantiations comprising a distinct network core component, the entity $CNCP_0$ in charge of the control plane of this network core can be implemented by means of a first network item of equipment having identical or similar functionalities to those of a mobility management entity (MME in English) or control of the policy and charging rules (PCRF in English) according to the LTE standard (4G), or indeed both these entities combined, while the entity $CNUP_0$ in charge of the user plane of this network core can be implemented by means of a second network item of equipment having identical or similar functionalities to those of a gateway S-GW according to this same LTE standard (4G).

Moreover, the dispatching of correspondence rules Ri was described above as being able to be performed during the attachment of the terminal UE to a default network slice instantiation S0 or on request emanating from the terminal UE subsequent to the verification of the expiry of the stored rules, this verification being able to be triggered by the receipt of an uplink packet from the module APP. The dispatching of these rules can also be done spontaneously by the entity $CNCP_0$ of this default instantiation S0, provided that the terminal UE is actually attached to this default instantiation S0, for example subsequent to an updating of these rules in the network.

Furthermore, although FIG. 1 illustrates only a single entity $ANCP_0$, the invention also applies to a plurality of entities $ANCP_{0,1}$, $ANCP_{0,2}$, . . . together forming one and the same control plane of an access network for a single network slice instantiation S0. The same holds for the other entities $ANCP_i$, $CNCP_i$, $ANUP_i$ and $CNUP_i$ illustrated in FIG. 1.

An exemplary embodiment of the present remedies the drawbacks of the prior art. Although the present disclosure has been described with reference to one or more examples, workers skilled in the art will recognize that changes may be made in form and detail without departing from the scope of the disclosure and/or the appended claims.

What is claimed is:

1. A method for transmitting in a communication network uplink data from an application module in a user terminal, comprising the following acts:
   determining, by said user terminal, if a correspondence exists between an application module providing at least one uplink packet and at least one rule designating a network slice instantiation to be used for transmitting uplink packets in the communication network; and
   in response to a determination by said user terminal that the application module providing at least one uplink packet corresponds to a rule designating a network slice instantiation to be used for transmitting the uplink packet in the communication network, transmitting said at least one uplink packet from the user terminal to an entity for access to a user plane of the designated network slice instantiation; and
   in response to a determination by said user terminal that no rule designating a network slice instantiation corresponds to the application module providing at least one uplink packet, transmitting said at least one uplink packet from the user terminal to an entity for access to a user plane of a default network slice instantiation.

2. The method as claimed in claim 1, in which the user terminal further receives, from an entity for access to the control plane of the default network slice instantiation, a message containing said at least one rule designating a network slice instantiation.

3. The method as claimed in claim 1, wherein, when the application module providing at least one uplink packet corresponds to a rule designating a network slice instantiation to which the user terminal is not attached, the user terminal transmits an attachment request to an entity for access to a control plane of the designated network slice instantiation, said at least one uplink packet being transmitted subsequent to receipt of an attachment acknowledgment message originating from the entity for access to the control plane.

4. The method as claimed in claim 1, in which said at least one rule contains at least one parameter from among a destination address of the packets, a transport protocol, a source port, a destination port, an application protocol, an item of information of location of the terminal or a time slot of application of the rule, the verification of the correspondence between the application module providing at least one uplink packet and said at least one rule comprising verifying the applicability of said parameter.

5. The method as claimed in claim 1, further comprising determining, by the user terminal, whether the application module provides at least one uplink packet belonging to a new data stream,
   the act of determining by the user terminal of the correspondence between the application module providing at least one uplink packet and at least one rule being performed after that it has been determined by the user terminal that the at least one uplink packet provided by the application module belongs to a new data stream; and
   in response to a determination by the user terminal that the at least one uplink packet provided by the application module does not belong to a new data stream, the method further comprises transmitting said at least one uplink packet from the user terminal to an entity for access to the user plane of a network slice instantiation used for at least one previous uplink packet of the data stream to which the at least one uplink packet belongs.

6. The method as claimed in claim 1, wherein the method further comprises, when the terminal is attached to a network slice instantiation and if the user terminal does not exchange any payload data packet with an entity for access to the user plane of said attached network slice instantiation during a determined time span, transmitting from the user terminal a detachment request to an entity for access to a control plane of said attached network slice instantiation.

7. The method as claimed in claim 6, in which the detachment request relates to the default network slice instantiation and is transmitted to an entity for access to a control plane of said default network slice instantiation, the method furthermore comprising:
   verifying a parameter of duration of validity contained in said at least one rule; and
   when the duration of validity of said at least one rule has expired, transmitting, from the user terminal to the entity for access to the control plane of the default network slice instantiation, a request for attachment to the default network slice instantiation and, subsequent to receipt of an attachment acknowledgment message, a request for updating said at least one rule.

8. A user terminal comprising a transmitter, a receiver and a processor,
   wherein the processor is configured to determine if a correspondence exists between an application module providing at least one uplink packet and at least one rule designating a network slice instantiation in a communication network in which uplink packets are to be transmitted;
   wherein the transmitter is configured to, in response to a determination that the application module providing at least one uplink packet corresponds to a rule of said at least one rule designating a network slice instantiation, transmit said at least one uplink packet to an entity for access to a user plane of the designated network slice instantiation; and
   wherein the transmitter is further configured to, in response to a determination that no rule designating a network slice instantiation corresponds to the application module providing at least one uplink packet, transmit said at least one uplink packet to an entity for access to a user plane of a default network slice instantiation.

9. The user terminal as claimed in claim 8, wherein the receiver is further configured to receive, during a prior phase of attachment of the user terminal to the default network slice instantiation, an attachment acknowledgment message from an entity for access to a control plane of the default network slice instantiation, said attachment acknowledgement message containing said at least one rule designating a network slice instantiation.

10. The user terminal as claimed in claim 8, wherein the receiver is further configured to receive, from an entity for access to the control plane of the default network slice instantiation, a message containing said at least one rule designating a network slice instantiation.

11. The user terminal as claimed in claim 8, in which said at least one rule comprises a parameter of duration of validity,
   the processor being further configured to verify the parameter of duration of validity of said at least one rule; and
   when it has been verified by the processor that the duration of validity of said at least one rule has expired, the transmitter is configured to transmit, to an entity for access to a control plane of the default network slice instantiation, a request for obtaining a message for updating said at least one rule.

12. The user terminal as claimed in claim 8, wherein, when it is determined that the application module providing at least one uplink packet corresponds to a rule designating a network slice instantiation to which the user terminal is not attached, the transmitter is further configured to transmit an attachment request to an entity for access to a control plane of the designated network slice instantiation, the at least one uplink packet being transmitted subsequent to the receipt by the receiver of an attachment acknowledgment message originating from the entity for access to the control plane.

13. The user terminal as claimed in claim 8, in which said at least one rule contains at least one parameter from among a destination address of the packets, a transport protocol, a source port, a destination port, an application protocol, an item of information of location of the terminal or a time slot of application of the rule, the verification by the processor of the correspondence between the application module providing at least one uplink packet and said at least one rule comprising the verification by the processor the applicability of said parameter.

14. The user terminal as claimed in claim 8, wherein the processor is further configured to verify whether the application module provides at least one uplink packet belonging to a new data stream, the verifying by the processor of the correspondence between the application module providing at least one uplink packet and at least one rule being performed after it has been verified by the processor that the at least one uplink packet provided by the application module belongs to a new data stream; and when the processor has verified that the at least one uplink packet provided by the application module does not belong to a new data stream, the transmitter being configure to transmit said at least one uplink packet to an entity for access to the user plane of a network slice instantiation used for at least one previous uplink packet of the data stream to which the at least one uplink packet belongs.

\* \* \* \* \*